United States Patent
Adolphe

(10) Patent No.: US 12,475,221 B2
(45) Date of Patent: Nov. 18, 2025

(54) METHODS, SYSTEMS, APPARATUSES, AND DEVICES FOR FACILITATING FOG COMPUTING AND PROVIDING RESILIENCY AGAINST ATTACKS

(71) Applicant: Forward Edge-AI, Inc., San Antonio, TX (US)

(72) Inventor: Eric Adolphe, San Antonio, TX (US)

(73) Assignee: FORWARD EDGE-AI, INC., San Antonio, TX (US)

( * ) Notice: Subject to any disclaimer, the term of this patent is extended or adjusted under 35 U.S.C. 154(b) by 181 days.

(21) Appl. No.: 18/326,633

(22) Filed: May 31, 2023

(65) Prior Publication Data

US 2024/0403424 A1 Dec. 5, 2024

(51) Int. Cl.
H04L 29/06 (2006.01)
G06F 21/56 (2013.01)
H04L 9/40 (2022.01)

(52) U.S. Cl.
CPC .......... *G06F 21/56* (2013.01); *H04L 63/0428* (2013.01); *G06F 2221/034* (2013.01)

(58) Field of Classification Search
CPC .................. G06F 21/56; H04L 9/40
See application file for complete search history.

(56) References Cited

U.S. PATENT DOCUMENTS

| 11,588,798 B1 * | 2/2023 | Cline | H04L 63/0272 |
| 12,199,958 B1 * | 1/2025 | Layton | H04L 63/0428 |
| 2019/0166152 A1 * | 5/2019 | Steele | H04L 63/1441 |

* cited by examiner

*Primary Examiner* — Jason K Gee
(74) *Attorney, Agent, or Firm* — HUNTON ANDREWS KURTH LLP

(57) ABSTRACT

A system for facilitating fog computing and providing resiliency against attacks. The system comprises a data center device, a network switch, and encryption retransmission devices. The encryption retransmission devices comprise an encryption unit and a communication unit. The encryption unit encrypts an egressing native packet received from the network switch and adds a connectionless header forms an egressing connectionless datagram, and decrypts an encrypted ingressing native packet of an ingressing connectionless datagram. The communication unit adds a complex header to the egressing connectionless datagram for forming an egressing packet for delivery to an external encryption retransmission device, receives an ingressing packet comprising the encrypted ingressing native packet and a complex header from the external encryption retransmission device, removes the complex header and adds a connectionless header forming the ingressing connectionless datagram. The data center device performs data center operation on the ingressing native packet to generate the egressing native packet.

13 Claims, 11 Drawing Sheets

METHODS, SYSTEMS, APPARATUSES, AND DEVICES FOR FACILITATING FOG COMPUTING AND PROVIDING RESILIENCY AGAINST ATTACKS

FIELD OF THE INVENTION

Generally, the present disclosure relates to the field of data processing. More specifically, the present disclosure relates to methods, systems, apparatuses, and devices for facilitating fog computing and providing resiliency against attacks.

BACKGROUND OF THE INVENTION

Existing techniques for facilitating fog computing and providing resiliency against attacks are deficient with regard to several aspects. For instance, current technologies only provide a single channel for facilitating communication with a protocol free encryption device (PFED). As a result, different technologies are needed to provide more than one channel for facilitating communication with the protocol free encryption device (PFED). Furthermore, current technologies do not provide fog computing services in the PFED. As a result, different technologies are needed for providing fog computing services in the PFED.

Therefore, there is a need for improved methods, systems, apparatuses, and devices for facilitating fog computing and providing resiliency against attacks that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a system for facilitating fog computing and providing resiliency against attacks, in accordance with some embodiments. Accordingly, the system may include a data center device, a network switch, and a plurality of encryption retransmission devices. Further, the network switch may be communicatively coupled with the data center device. Further, the network switch may include a plurality of ports. Further, the plurality of encryption retransmission devices may be connected with the network switch through the plurality of ports. Further, at least one of the plurality of encryption retransmission devices associated with at least one of the plurality of ports may include at least one encryption unit and at least one communication unit. Further, the at least one encryption unit may be configured for encrypting an egressing native packet received from the network switch using at least one encryption key to create an encrypted egressing native packet. Further, the data center device may be configured for generating the egressing native packet. Further, the at least one encryption unit may be configured for adding a connectionless header to the encrypted egressing native packet to form an egressing connectionless datagram. Further, the at least one encryption unit may be configured for receiving an ingressing connectionless datagram may include an ingressing encrypted native packet. Further, the at least one encryption unit may be configured for decrypting the encrypted ingressing native packet using the at least one encryption key to obtain an ingressing native packet. Further, the data center device may be configured for performing at least one data center operation on the ingressing native packet for facilitating the fog computing. Further, the generating of the egressing native packet may be based on the performing. Further, the at least one communication unit may be communicatively coupled with the at least one encryption unit. Further, the at least one communication unit may be paired with at least one external communication unit of at least one external encryption retransmission device associated with at least one external device. Further, the at least one communication unit may be configured for receiving the egressing connectionless datagram. Further, the at least one communication unit may be configured for adding a complex header to the egressing connectionless datagram for forming an egressing packet for delivery to the at least one external encryption retransmission device. Further, the at least one communication unit may be configured for receiving an ingressing packet may include the encrypted ingressing native packet and a complex header from the at least one external encryption retransmission device. Further, the at least one communication unit may be configured for removing the complex header from the ingressing packet. Further, the at least one communication unit may be configured for adding a connectionless header to the ingressing packet for forming the ingressing connectionless datagram. Further, the ingressing connectionless datagram may include the encrypted ingressing native packet.

Further disclosed herein is a system for facilitating fog computing and providing resiliency against attacks, in accordance with some embodiments. Accordingly, the system may include a data center device, a network switch, and a plurality of encryption retransmission devices. Further, the network switch may be communicatively coupled with the data center device. Further, the network switch may include a plurality of ports. Further, the plurality of encryption retransmission devices may be connected with the network switch through the plurality of ports. Further, at least one of the plurality of encryption retransmission devices associated with at least one of the plurality of ports may include at least one encryption unit and at least one communication unit. Further, the at least one encryption unit may be configured for encrypting an egressing native packet received from the network switch using at least one encryption key to create an encrypted egressing native packet. Further, the data center device may be configured for generating the egressing native packet. Further, the at least one encryption unit may be configured for adding a connectionless header to the encrypted egressing native packet to form an egressing connectionless datagram. Further, the at least one encryption unit may be configured for receiving an ingressing connectionless datagram may include an ingressing encrypted native packet. Further, the at least one encryption unit may be configured for decrypting the encrypted ingressing native packet using the at least one encryption key to obtain an ingressing native packet. Further, the data center device may be configured for performing at least one data center operation on the ingressing native packet for facilitating the fog computing. Further, the generating of the egressing native packet may be based on the performing. Further, the at least one communication unit may be communicatively coupled with the at least one encryption unit. Further, the at least one communication unit may be paired with at least one external communication unit of at least one external encryption retransmission device associated with at least one external device. Further, the at least one communication unit may be configured for receiving the egressing connectionless datagram. Further, the at least one communication unit may be configured for adding a complex header to the egressing connectionless datagram for forming an egressing packet for delivery to the at least one external encryption retransmission device. Further, the at least one communication unit may be configured for receiving an ingressing packet may include the encrypted ingressing native packet and a complex header from the at least one external encryption retransmission device. Further, the at least one communication unit may be configured for removing the complex header from the ingressing packet. Further, the at least one communication unit may be configured for adding a connectionless header to the ingressing packet for forming the ingressing connectionless datagram. Further, the ingressing connectionless datagram may include the encrypted ingressing native packet. Further, the at least one external encryption unit may be configured for encrypting an egressing native packet received from the at least one external device using at least one encryption key to create an encrypted egressing native packet. Further, the at least one external encryption unit may be configured for adding a connectionless header to the encrypted egressing native packet to form an egressing connectionless datagram. Further, the at least one external encryption unit may be configured for receiving an ingressing connectionless datagram may include an ingressing encrypted native packet. Further, the at least one external encryption unit may be configured for decrypting the encrypted ingressing native packet using the at least one encryption key. Further, the at least one external communication unit may be paired with the at least one communication unit of at least one of the plurality of encryption retransmission devices. Further, the at least one external communication unit may be configured for receiving the egressing connectionless datagram. Further, the at least one external communication unit may be configured for adding a complex header to the egressing connectionless datagram for forming an egressing packet for delivery to at least one of the plurality of encryption retransmission devices. Further, the at least one external communication unit may be configured for receiving an ingressing packet may include the encrypted ingressing native packet and a complex header from at least one of the plurality of encryption retransmission devices. Further, the at least one external communication unit may be configured for removing the complex header from the ingressing packet. Further, the at least one external communication unit may be configured for adding a connectionless header to the ingressing packet for forming an ingressing connectionless datagram. Further, the ingressing connectionless datagram may include the encrypted ingressing native packet.

Further disclosed herein is a system for facilitating fog computing and providing resiliency against attacks, in accordance with some embodiments. Accordingly, the system may include a data center device, a network switch, a plurality of encryption retransmission devices, and at least one anomaly detector. Further, the network switch may be communicatively coupled with the data center device. Further, the network switch may include a plurality of ports. Further, the plurality of encryption retransmission devices may be connected with the network switch through the plurality of ports. Further, at least one of the plurality of encryption retransmission devices associated with at least one of the plurality of ports may include at least one encryption unit and at least one communication unit. Further, the at least one encryption unit may be configured for encrypting an egressing native packet received from the network switch using at least one encryption key to create an encrypted egressing native packet. Further, the data center device may be configured for generating the egressing native packet. Further, the at least one encryption unit may be configured for adding a connectionless header to the encrypted egressing native packet to form an egressing connectionless datagram. Further, the at least one encryption unit may be configured for receiving an ingressing connectionless datagram may include an ingressing encrypted native packet. Further, the at least one encryption unit may be configured for decrypting the encrypted ingressing native packet using the at least one encryption key to obtain an ingressing native packet. Further, the data center device may be configured for performing at least one data center operation on the ingressing native packet for facilitating the fog computing. Further, the generating of the egressing native packet may be based on the performing. Further, the at least one communication unit may be communicatively coupled with the at least one encryption unit. Further, the at least one communication unit may be paired with at least one external communication unit of at least one external encryption retransmission device associated with at least one external device. Further, the at least one communication unit may be configured for receiving the egressing connectionless datagram. Further, the at least one communication unit may be configured for adding a complex header to the egressing connectionless datagram for forming an egressing packet for delivery to the at least one external encryption retransmission device. Further, the at least one communication unit may be configured for receiving an ingressing packet may include the encrypted ingressing native packet and a complex header from the at least one external encryption retransmission device. Further, the at least one communication unit may be configured for removing the complex header from the ingressing packet. Further, the at least one communication unit may be configured for adding a connectionless header to the ingressing packet for forming the ingressing connectionless datagram. Further, the ingressing connectionless datagram may include the encrypted ingressing native packet. Further, the at least one anomaly detector may be communicatively coupled with at least one of the data center device and at least one of the plurality of encryption retransmission devices. Further, the at least one anomaly detector may be configured for analyzing at least one signal associated with at least one of the data center device and at least one of the plurality of encryption retransmission devices using at least one machine learning model. Further, the at least one anomaly detector may be configured for determining an attack associated with at least one of the data center device and at least one of the plurality of encryption in retransmission devices based on the analyzing. Further, the at least one anomaly detector may be configured for generating an alert for the attack based on the determining of the attack.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
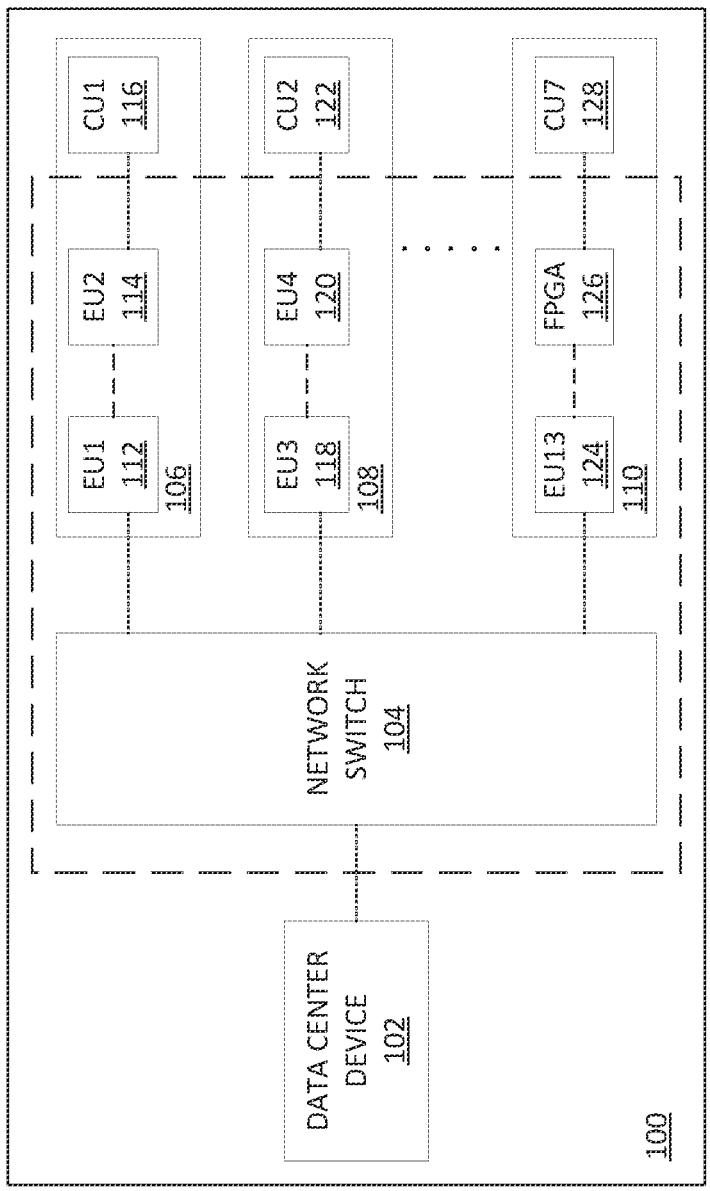
FIG. 1 is a block diagram of a system 100 for facilitating fog computing and providing resiliency against attacks, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating fog computing and providing resiliency against attacks, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g., username, password, passphrase, PIN, secret question, secret answer, etc.) and/or possession of a machine readable secret data (e.g., encryption key, decryption key, bar codes, etc.) and/or or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device, etc.) corresponding to the performance of the one or more steps, environmental variables (e.g., temperature, humidity, pressure, wind speed, lighting, sound, etc.) associated with a device corresponding to the performance of the one or more steps, physical state and/or physiological state and/or psychological state of the user, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor, etc.), a biometric sensor (e.g., a fingerprint sensor), an environmental variable sensor (e.g., temperature sensor, humidity sensor, pressure sensor, etc.) and a device state sensor (e.g., a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods, systems, apparatuses, and devices for facilitating fog computing and providing resiliency against attacks.

Further, the disclosed system implements a protocol free encryption device (PFED) (see U.S. patent application Ser. No. 17/200,468, entitled "PROTOCOL FREE ENCRYPTING DEVICE," filed Mar. 12, 2021; incorporated herein by reference). Further, the encryption retransmission device may include galvanic isolation to isolate data and power pins between encryption units and the communication units of the encryption retransmission device to protect against attacks such as PowerHammer. Further, the encryption retransmission device may include a network interface module (NIM) that on-boards all communication interfaces onto a PCB (printed circuit board) comprising the encryption units and communication units, connecting through the communication units to maintain a protocol break (see, U.S. patent application Ser. No. 17/200,468, entitled "PROTOCOL FREE ENCRYPTING DEVICE," filed Mar. 12, 2021; incorporated herein by reference), thus allowing for wireless communications. Further, the PCB is encased in resin to prevent tampering and protect against BitWhisper (heat emission) attacks. Further, the encryption retransmission device may also include an Anomaly Detector (AD) (or anti tamper) that uses three different algorithms acting independently to detect anomalies that may signal an attack. The algorithms of the AD use multi-variant signal analysis. Further, the AD is capable of warning an operator and also executing an "immune system" type of response. Further, the encryption retransmission device may also include an inner case (Faraday Cage) to limit the leaking of radio signals from the encryption retransmission device, and further prevent access by an attacker. Further, the encryption retransmission device may also include a custom resin/plastic outer case to allow integration into multiple use cases. Further, the encryption retransmission device also provides a Four-hour backup battery operation. Further, the inner cage of the encryption retransmission device may be Extruded Aluminum Inner Case that houses the PCB and acts as a Faraday cage. Further, the anomaly detector may include a Raspberry Pi4 loaded with a software application. Further, a case of the anomaly detector is designed to be interlocked with the outer case of the encryption retransmission device (Isidore device) forming an Isidore Quantum device. Further, the encryption retransmission device (Isidore device) includes an embedded software application. Further, the anomaly detector may include multiple models such as Azure Anomaly Detector, Anomaly-Transformer, Anomaly Autoencoder, GLocalKD, STL, and RDP. Each AD will have three different models working independently to detect anomalies. An aggregator determines an attack based on the outputs of the three models. Further, the models are randomly installed on each AD. Further, the PFED incorporated in the disclosed system may be an encrypting device. Further, two encrypting devices are paired to provide communications between two trusted elements via an untrusted network. Further, any device in a network address space may be a trusted element. Further, the network address space may be a subnet in an enterprise network. Further, the device may include a smartphone, a tablet, a laptop, a desktop, a router, etc. are examples of devices in a network address space.

Further, each of the trusted elements, includes an interface, for receiving a trusted interconnect, providing a wired connection between the two encrypting devices, and the trusted element, thereby providing communications between the trusted element and the encrypting device. Further, the encrypting devices are associated with the trusted elements via trusted interconnects. Further, the two encrypting devices need to be paired to allow communication between the trusted elements.

Each sending trusted element generates native packets to be received by another trusted element. Further, the native packets may take any form that would allow the native packets to normally travel between the trusted elements without encrypting devices. Further, the native packets may include a data packet riding in a frame, an IP packet riding in an Ethernet frame, etc. Further, each of the encrypting devices may include an encryption unit and a communication unit linked to the encryption unit via a connectionless interconnect provided by a bus. The connectionless interconnect utilizes a point-to-point connectionless protocol for the transmission of messages between the encryption unit and the communication unit. This point-to-point connectionless interconnect simply sends messages between the encryption unit and the communication unit. No arrangement (such as a handshake) is made between the encryption unit and the communication unit before messages are sent; Each encryption unit is configured with a key for encrypting and decrypting messages. For trusted elements to communicate, the encryption unit's keys of the two encrypting devices must match.

The encryption devices include interfaces and a one-way interface. Each interface may include an Ethernet port, a serial port, or a USB port. Further, the interfaces may be in communication with the trusted element interface of the trusted element via the trusted interconnect, e.g., an Ethernet cable, a serial wire, or a USB cable. Further, the interfaces are not associated with an address. The interfaces are not addressable and therefore, the messages are treated strictly as data, not as network packets before processing by the encryption unit.

The one-way interface may include a GPIO pin, a twisted pair wire, etc. The one-way interface allows for instructions generated by the encryption unit to be signaled to the communication unit. Further, the instructions may instruct the communication unit to halt operations.

Further, the passive interface and an active/addressable interface are both included in each communication unit. Through the connectionless interconnection, the passive interface of the communication unit of one encrypting device is in contact with the second passive interface of the encryption unit of the other encrypting device. The address is linked to the active/addressable interface. To transmit any packets from the passive interface into a form that will be routable to the other communication unit of the paired PFED, the communication unit of one encrypting device is paired with the communication unit of the other encrypting device. The Internet or other untrusted networks are used for communications between communication units. Further, the native packet is also created by one trusted element and sent to the other as part of the communications between the trusted elements. The native packet could be an Ethernet frame, for instance, and could have a frame header containing the source and destination addresses. Through the trusted interconnect and the encryption unit's interface, the native packet is sent to the other encryption unit of the other encrypting device. The encryption unit ingests the entire native pack (including the frame header and the payload) when it receives the native packet and encrypts the entire native packet using the encryption key. To create an outgoing connectionless datagram, the encryption unit additionally adds a connectionless header to the encrypted native packet. An atomic, stateless datagram is the connectionless datagram.

Fields indicating message boundaries (such as length, character count, size, etc.) or other static properties of the message may be included in the connectionless header. Using pre-established criteria connected to the fields of the connectionless header, the receiver is free to accept or reject a frame regardless of the connectionless datagram's contents. The connectionless header may also contain fields like the length. The maximum length of the frame that the receiver (i.e., the encryption unit or the communication unit) will accept may be bound by a pre-specified constant. The receiver may safely discard the connectionless datagram if its size exceeds the predetermined maximum length, as determined by the receiver. The connectionless header does not contain any dynamic properties, so the receiver can process a frame without keeping track of any previous state data. This greatly simplifies the logic and state machine needed by the receiver to correctly process the connectionless header. Human inspection is capable of reaching a known termination in each state. The ability to assess the security boundary logic for certification and correctness is significantly improved as a result.

The untrusted network can comprehend the intricate header, which permits the delivery of the packet to the paired communication unit. The complex header, for instance, contains both a source address and a destination address. Dynamically defined fields may also be present in the complex header. In order to deliver the packet to the paired communication unit (the communication unit of the encrypting device), the untrusted network routes the packet as necessary. A connectionless header is added to the connectionless datagram to create an incoming connectionless datagram after the communication unit of the encrypting device removes the complex header added by the communication unit and receives the packet. The connectionless header may have fields indicating message boundaries (such as length) or other static properties of the message, as previously mentioned.

A trust boundary between the trusted environment (trusted network) and the untrusted environment (untrusted network) is created by the encryption device pair, which offers a cryptographically paired, point-to-point link that enforces logical and physical isolation. By placing independent devices at the endpoints of the connectionless interconnect (i.e., the communication unit and the encryption unit), the physical isolation is achieved. The communication unit handles the intricate native untrusted network processing independently from the encryption unit's straightforward connectionless network processing. By converting the untrusted native packet sent to the active/addressable interface into a connectionless packet, the logical isolation is achieved. The native packet is always encrypted before it passes from the trusted element to the communication unit and is cryptographically authenticated by the encryption unit of the paired encrypting device before it is allowed to pass to the trusted element.

An entity situated on the communication unit side of the connectionless-interconnect cannot create a packet that has meaning for the trusted element unless the key is known to that entity since all packets arriving at the trusted element must be received via the encryption unit. An encrypting device pair, or encrypting device pair, establishes a tunnel across the untrusted network to connect two devices in trusted spaces via a virtual wire through untrusted spaces. The environments that are trusted and untrusted are totally separate from one another. No information is shared about the other. This is meant by "protocol-free". Networking and encryption "protocols" are separate from one another. Additionally, the encryption units are set up to send inter-PFED control messages so they can communicate with one another.

The cryptographic state of the encryption units is managed by means of these inter-PFED control messages. In order to rekey, manage the cryptographic algorithm, manage the status of the encryption units (e.g., log, online/offline, etc.), start a new session, etc., the PFED's encryption unit may also generate an inter-PFED control message for delivery to the PFED's encryption unit. These inter-PFED control messages are packetized as connectionless packets and travel along the same PFED-to-PFED tunnel as the native packets originating at the trusted element, but they are identified as control messages. They originated at the encryption unit, encrypted by the encryption unit using a key, packetized, and sent along the PFED-to-PFED tunnel. The inter-PFED control messages are not sent to the trusted element because they are marked as control messages.

Further, the present disclosure describes a system facilitating secure updating of machine learning models. Further, the system may include a model aggregator device and an encryption device. Further, the model aggregator device provides updates for machine learning models based on requests. Further, the machine learning models are modified, updated, replaced, etc. using the updates. Further, the encryption device may be communicatively coupled with the processing device. Further, the encryption device may include an encryption unit and a communication unit. Further, the encryption unit may be configured for encrypting a native packet corresponding to an update received from the model aggregator device using an encryption key to create an encrypted native packet. Further, the encryption unit may be configured for adding a connectionless header to the encrypted native packet to form an egressing connectionless datagram. Further, the encryption unit may be configured for decrypting a second encrypted native packet of an ingressing connectionless datagram using the encryption key to obtain a request for updating a machine learning model. Further, the communication unit may be communicatively coupled with the encryption unit. Further, the communication unit may be paired with a paired communication unit of a paired encryption device. Further, the communication unit may be configured for adding a complex header to the egressing connectionless datagram for forming a first packet for delivery to the paired encryption device. Further, the communication unit may be configured for receiving a second packet comprising the second encrypted native packet and a complex header from the paired encryption device. Further, the communication unit may be configured for removing the complex header from the second packet. Further, the communication unit may be configured for adding a connectionless header to the second packet for forming the ingressing connectionless datagram. Further, the ingressing connectionless datagram may include the second encrypted native packet.

Further, the present disclosure describes a device that is a Quantum-Resistant and Cyber-Resilient Fog Computing Node. Further, the Quantum-Resistant and Cyber-Resilient Fog Computing Node may include a switch with 7 ports. One port is for fog services (similar to the control port). Further, the Quantum-Resistant and Cyber-Resilient Fog Computing Node may include a "data center on a chip (DCoC)". Further, the DCoC makes the Quantum-Resistant and Cyber-Resilient Fog Computing Node a secure Fog computer node. Further, the Quantum-Resistant and Cyber-Resilient Fog Computing Node may include encryption units EU1 through EU13 and communication units CU1 through CU7. Further, the Quantum-Resistant and Cyber-Resilient Fog Computing Node may enable IoT devices and other edge devices to get "cloud" services at the edge, when access to the cloud is not possible. Further, the Quantum-Resistant and Cyber-Resilient Fog Computing Node may allow devices connected to a CU (e.g., CU1) to exchange data with other devices (e.g., connected to CU4) in a secure manner. This is possible by decrypting the traffic (native packets), sending it in through the switch, re-encrypting, and sending the traffic to the correct port. Further, the Quantum-Resistant and Cyber-Resilient Fog Computing Node do not allow any traffic from EUD through encryption units (EUs). Further, the Quantum-Resistant and Cyber-Resilient Fog Computing Node must be completely contained with the only traffic coming in through the communication units (CUs).

Further, the present disclosure describes a device that is a secure fog computing device. Further, the secure fog computing device may have an AI chip and on-board Flash Memory (such as a data center device). Further, the secure fog computing device may include a trusted zone and an untrusted zone. Further, the AI chip and the on-board Flash Memory are present in the trusted zone of the secure fog computing device. All power and data pins of components (EUs) in the trusted zone may be isolated from the power and data pins of components (CUs) in the untrusted zone. The (ethernet) output of the chip will go to the EU1 (Encryption Unit 1). Further, the secure fog computing device may have the FPGA configuration.

Further, the present disclosure describes a device that is a Quantum-Resistant and Cyber Resilient Fog Computing Node. The Quantum-Resistant and Cyber Resilient Fog Computing Node has seven channels. The Quantum-Resistant and Cyber Resilient Fog Computing Node has a trust boundary. Behind the trust boundary, there is a 7 port switch that connects to the seven channels on one side and a data center on a chip on the other side. he Quantum-Resistant and Cyber Resilient Fog Computing Node provides galvanic isolation using a galvanic isolator to isolate the power and data pins of components (EUs) in the trusted zone from the power and data pins of components (CUs) in the untrusted zone In further embodiments, the device may include a resin enclosure comprised of at least one resin. Further, the resin enclosure encloses the device.

In further embodiments, the device may include an inner enclosure enclosing the system. Further, the inner enclosure may be comprised of at least one metal. Further, the inner enclosure forms a Faraday cage around the device.

FIG. 1 is a block diagram of a system 100 for facilitating fog computing and providing resiliency against attacks, in accordance with some embodiments. Accordingly, the system 100 may include a data center device 102, a network switch 104, and a plurality of encryption retransmission devices 106-110.

Further, the data center device 102 may include an AI chip and an on-board Flash Memory.

Further, the network switch 104 may be communicatively coupled with the data center device 102. Further, the network switch 104 may include a plurality of ports. Further, the network switch 104 may be a seven-port Ethernet IC switch. Further, the plurality of ports may be seven ports.

Further, the plurality of encryption retransmission devices 106-110 may be connected with the network switch 104 through the plurality of ports. Further, the plurality of encryption retransmission devices 106-110 may be a plurality of PFEDs. Further, at least one of the plurality of encryption retransmission devices 106-110 associated with at least one of the plurality of ports may include at least one encryption unit (112-114, 118-120, and 124-126) and at least one communication unit (116, 122, and 128). Further, the at least one encryption unit (112-114, 118-120, and 124-126) may be configured for encrypting an egressing native packet received from the network switch 104 using at least one encryption key to create an encrypted egressing native packet. Further, the data center device 102 may be configured for generating the egressing native packet. Further, the at least one encryption unit (112-114, 118-120, and 124-126) may be configured for adding a connectionless header to the encrypted egressing native packet to form an egressing connectionless datagram. Further, the at least one encryption unit (112-114, 118-120, and 124-126) may be configured for receiving an ingressing connectionless datagram that may include an ingressing encrypted native packet. Further, the at least one encryption unit (112-114, 118-120, and 124-126) may be configured for decrypting the encrypted ingressing native packet using the at least one encryption key to obtain an ingressing native packet. Further, the data center device 102 may be configured for performing at least one data center operation on the ingressing native packet for facilitating the fog computing. Further, the at least one data center operation may include a computing operation, a storage operation, a networking operation, etc. Further, the computing operation may include data processing operations. Further, the generating of the egressing native packet may be based on the performing. Further, the at least one communication unit (116, 122, and 128) may be communicatively coupled with the at least one encryption unit (112-114, 118-120, and 124-126). Further, the at least one communication unit (116, 122, and 128) may be paired with at least one external communication unit (306, 312, and 318) of at least one external encryption retransmission device (202, 204, and 206) associated with at least one external device (208, 210, and 212). Further, the at least one communication unit (116, 122, and 128) may be configured for receiving the egressing connectionless datagram. Further, the at least one communication unit (116, 122, and 128) may be configured for adding a complex header to the egressing connectionless datagram for forming an egressing packet for delivery to the at least one external encryption retransmission device (202, 204, and 206). Further, the at least one communication unit (116, 122, and 128) may be configured for receiving an ingressing packet may include the encrypted ingressing native packet and a complex header from the at least one external encryption retransmission device (202, 204, and 206). Further, the at least one communication unit (116, 122, and 128) may be configured for removing the complex header from the ingressing packet. Further, the at least one communication unit (116, 122, and 128) may be configured for adding a connectionless header to the ingressing packet for forming the ingressing connectionless datagram. Further, the ingressing connectionless datagram may include the encrypted ingressing native packet.

In further embodiments, the system 100 may include at least one galvanic isolator electromagnetically coupled with the at least one encryption unit (112-114, 118-120, and 124-126), the at least one communication unit (116, 122, and 128) of at least one of the plurality of encryption retransmission devices 106-110, and the network switch 104. Further, the at least one galvanic isolator may be configured for galvanically isolating the at least one encryption unit (112-114, 118-120, and 124-126) of at least one of the plurality of encryption retransmission devices 106-110 from the at least one communication unit (116, 122, and 128) of at least one of the plurality of encryption retransmission devices 106-110. Further, the at least one galvanic isolator may be configured for galvanically isolating the network switch 104 from the data center device 102.

Further, in some embodiments, the plurality of encryption retransmission devices 106-110 may include at least one first encryption retransmission device 106 and at least one second encryption retransmission device 108. Further, the at least one first encryption retransmission device 106 may be connected to the network switch 104 through at least one first port of the plurality of ports. Further, the at least one first encryption retransmission device 106 may include at least one first encryption unit (112-114) and at least one first communication unit 116. Further, the at least one first encryption unit (112-114) may be configured for encrypting a first egressing native packet received from the network switch 104 through the at least one first port using at least one encryption key to create a first encrypted egressing native packet. Further, the at least one first encryption unit (112-114) may be configured for adding a connectionless header to the first encrypted egressing native packet to form a first egressing connectionless datagram. Further, the at least one first encryption unit (112-114) may be configured for receiving a first ingressing connectionless datagram that may include a first ingressing encrypted native packet. Further, the at least one first encryption unit (112-114) may be configured for decrypting the first encrypted ingressing native packet using the at least one encryption key to obtain a first ingressing native packet. Further, the at least one first communication unit 116 may be communicatively coupled with the at least one first encryption unit (112-114). Further, the at least one first communication unit 116 may be paired with at least one first external communication unit 306 of at least one first external encryption retransmission device 202 associated with at least one first external device 208. Further, the at least one first communication unit 116 may be configured for receiving the first egressing connectionless datagram. Further, the at least one first communication unit 116 may be configured for adding a complex header to the first egressing connectionless datagram for forming a first egressing packet for delivery to the at least one first external encryption retransmission device 202. Further, the at least one first communication unit 116 may be configured for receiving a first ingressing packet may include the first encrypted ingressing native packet and a complex header from the at least one first external encryption retransmission device 202. Further, the at least one first communication unit 116 may be configured for removing the complex header from the first ingressing packet. Further, the at least one first communication unit 116 may be configured for adding a connectionless header to the first ingressing packet for forming the first ingressing connectionless datagram. Further, the first ingressing connectionless datagram may include the first encrypted ingressing native packet. Further, the at least one second encryption retransmission device 108 may be connected to the network switch 104 through at least one second port of the plurality of ports. Further, the at least one second encryption retransmission device 108 may include at least one second encryption unit (118-120) and at least one second communication unit 122. Further, the at least one second encryption unit (118-120) may be configured for encrypting a second egressing native packet received from the network switch 104 through the at least one second port using at least one encryption key to create a second encrypted egressing native packet. Further, the network switch 104 may be configured for transmitting the first ingressing native packet as the second egressing native packet to the at least one second encryption unit (118-120). Further, the at least one second encryption unit (118-120) may be configured for adding a connectionless header to the second encrypted egressing native packet to form a second egressing connectionless datagram. Further, the at least one second encryption unit (118-120) may be configured for receiving a second ingressing connectionless datagram that may include a second ingressing encrypted native packet. Further, the at least one second encryption unit (118-120) may be configured for decrypting the second encrypted ingressing native packet using the at least one encryption key to obtain a second ingressing native packet. Further, the network switch 104 may be configured for transmitting the second ingressive native packet as the first egressing native packet to the at least one first encryption unit (112-114). Further, the at least one second communication unit 122 may be communicatively coupled with the at least one second encryption unit (118-120). Further, the at least one second communication unit 122 may be paired with at least one second external communication unit 312 of at least one second external encryption retransmission device 204 associated with at least one second external device 210. Further, the at least one second communication unit 122 may be configured for receiving the second egressing connectionless datagram. Further, the at least one second communication unit 122 may be configured for adding a complex header to the second egressing connectionless datagram for forming a second egressing packet for delivery to the at least one second external encryption retransmission device 204. Further, the at least one second communication unit 122 may be configured for receiving a second ingressing packet may include the second encrypted ingressing native packet and a complex header from the at least one second external encryption retransmission device 204. Further, the at least one second communication unit 122 may be configured for removing the complex header from the second ingressing packet. Further, the at least one second communication unit 122 may be configured for adding a connectionless header to the second ingressing packet for forming the second ingressing connectionless datagram. Further, the second ingressing connectionless datagram may include the second encrypted ingressing native packet.

Further, in some embodiments, the data center device 102 may be at least one chip. Further, the at least one chip may be a Data Center on a Chip (DCoC).

Further, in some embodiments, at least one of the at least one encryption unit (112-114, 118-120, and 124-126) of at least one of the plurality of encryption retransmission devices 106-110 may include two encryption units (112-114 and 118-120). Further, the two encryption units (112-114 and 118-120) may be communicatively coupled.

Further, in some embodiments, the plurality of ports may include a control port. Further, the plurality of encryption retransmission devices 106-110 may include a control encryption retransmission device 110. Further, the at least one encryption unit (124-126) of the control encryption retransmission device 110 may include an encryption unit 124 and a field-programmable gate array (FPGA) 126. Further, the encryption unit 124 may be communicatively coupled with the network switch 104 through the control port. Further, the FPGA 126 may be communicatively coupled with the at least one communication unit 128 of the control encryption retransmission device 110.

Further, in some embodiments, the at least one external encryption retransmission device (202, 204, and 206) may include at least one external encryption unit (302-304, 308-310, and 314-316) and the at least one external communication unit (306, 312, and 318). Further, the at least one external encryption unit (302-304, 308-310, and 314-316) may be configured for encrypting an egressing native packet received from the at least one external device (208, 210, and 212) using at least one encryption key to create an encrypted egressing native packet. Further, the at least one external encryption unit (302-304, 308-310, and 314-316) may be configured for adding a connectionless header to the encrypted egressing native packet to form an egressing connectionless datagram. Further, the at least one external encryption unit (302-304, 308-310, and 314-316) may be configured for receiving an ingressing connectionless datagram that may include an ingressing encrypted native packet. Further, the at least one external encryption unit (302-304, 308-310, and 314-316) may be configured for decrypting the encrypted ingressing native packet using the at least one encryption key. Further, the at least one external communication unit (306, 312, and 318) paired with the at least one communication unit (116, 122, and 128) of at least one of the plurality of encryption retransmission devices 106-110. Further, the at least one external communication unit (306, 312, and 318) may be configured for receiving the egressing connectionless datagram. Further, the at least one external communication unit (306, 312, and 318) may be configured for adding a complex header to the egressing connectionless datagram for forming an egressing packet for delivery to at least one of the plurality of encryption retransmission devices 106-110. Further, the at least one external communication unit (306, 312, and 318) may be configured for receiving an ingressing packet may include the encrypted ingressing native packet and a complex header from at least one of the plurality of encryption retransmission devices 106-110. Further, the at least one external communication unit (306, 312, and 318) may be configured for removing the complex header from the ingressing packet. Further, the at least one external communication unit (306, 312, and 318) may be configured for adding a connectionless header to the ingressing packet for forming an ingressing connectionless datagram. Further, the ingressing connectionless datagram may include the encrypted ingressing native packet.

Further, in an embodiment, the at least one encryption unit (112-114, 118-120, and 124-126) may be configured for sending at least one message to the at least one external encryption unit (302-304, 308-310, and 314-316).

Further, in an embodiment, the at least one message manages at least one cryptographic state of the at least one encryption unit (112-114, 118-120, and 124-126) and the at least one external encryption unit (302-304, 308-310, and 314-316).

Further, in an embodiment, the at least one message manages at least one encryption key associated with the at least one encryption unit (112-114, 118-120, and 124-126) and the at least one external encryption unit (302-304, 308-310, and 314-316).

Further, in an embodiment, the at least one message manages at least one algorithm associated with the at least one encryption unit (112-114, 118-120, and 124-126) and the at least one external encryption unit (302-304, 308-310, and 314-316).

Further, in an embodiment, the at least one message manages at least one status associated with the at least one encryption unit (112-114, 118-120, and 124-126) and the at least one external encryption unit (302-304, 308-310, and 314-316).

Further, in an embodiment, the at least one encryption unit (112-114, 118-120, and 124-126) may be communicatively coupled to the at least one communication via a one-way connection for providing at least one instruction to the at least one communication unit (116, 122, and 128).

In further embodiments, the system 100 may include at least one anomaly detector 402-408 communicatively coupled with at least one of the data center device 102 and at least one of the plurality of encryption retransmission devices 106-110. Further, the at least one anomaly detector 402-408 may be configured for analyzing at least one signal associated with at least one of the data center device 102 and at least one of the plurality of encryption retransmission devices 106-110 using at least one machine learning model. Further, the at least one anomaly detector 402-408 may be configured for determining an attack associated with at least one of the data center device 102 and at least one of the plurality of encryption retransmission devices 106-110 based on the analyzing. Further, the at least one anomaly detector 402-408 may be configured for generating an alert for the attack based on the determining of the attack.

Further, in some embodiments, the system 100 may be implemented as a device.

Figure 2:
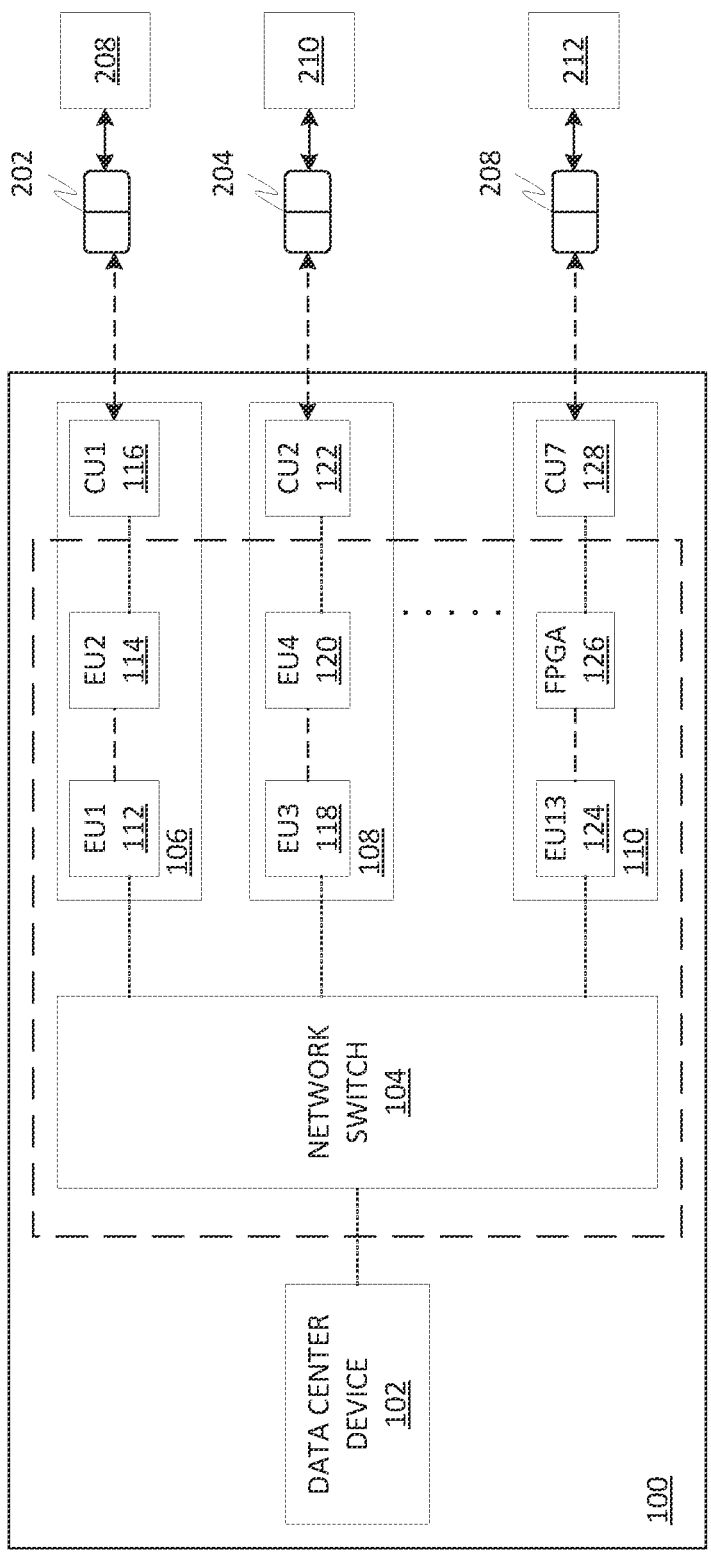
FIG. 2 is a block diagram of the system 100 with the at least one external encryption retransmission device (202, 204, and 206) and the at least one external device (208, 210, and 212), in accordance with some embodiments.

FIG. 2 is a block diagram of the system 100 with the at least one external encryption retransmission device (202, 204, and 206) and the at least one external device (208, 210, and 212), in accordance with some embodiments.

Figure 3:
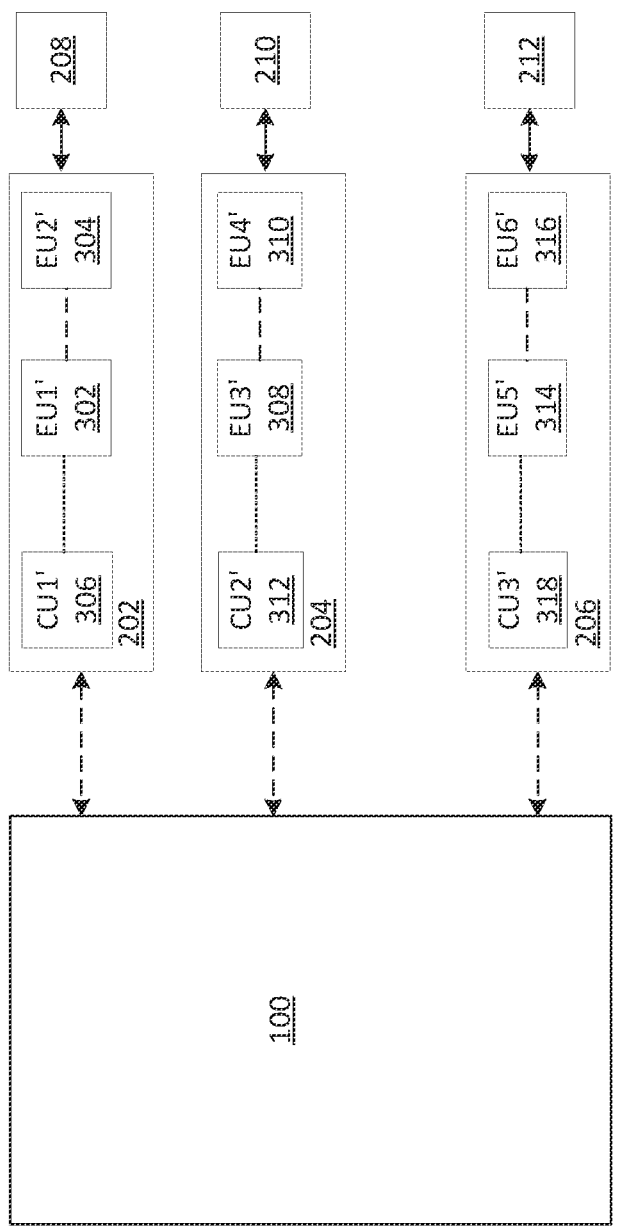
FIG. 3 is a block diagram of the at least one external encryption retransmission device (202, 204, and 206) and the at least one external device (208, 210, and 212) with the system 100, in accordance with some embodiments.

FIG. 3 is a block diagram of the at least one external encryption retransmission device (202, 204, and 206) and the at least one external device (208, 210, and 212) with the system 100, in accordance with some embodiments.

Figure 4:
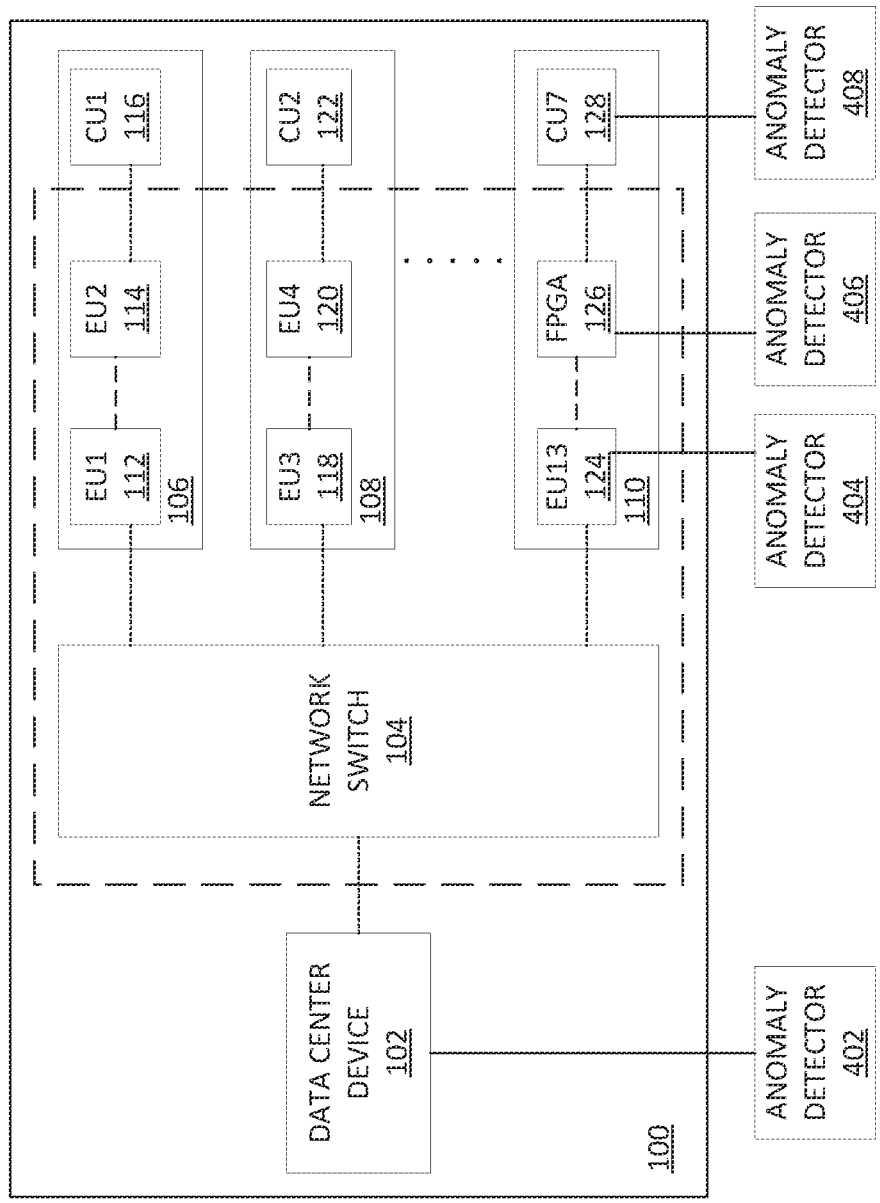
FIG. 4 is a block diagram of the system 100 with the at least one anomaly detector 402-408, in accordance with some embodiments.

FIG. 4 is a block diagram of the system 100 with the at least one anomaly detector 402-408, in accordance with some embodiments.

Figure 5:
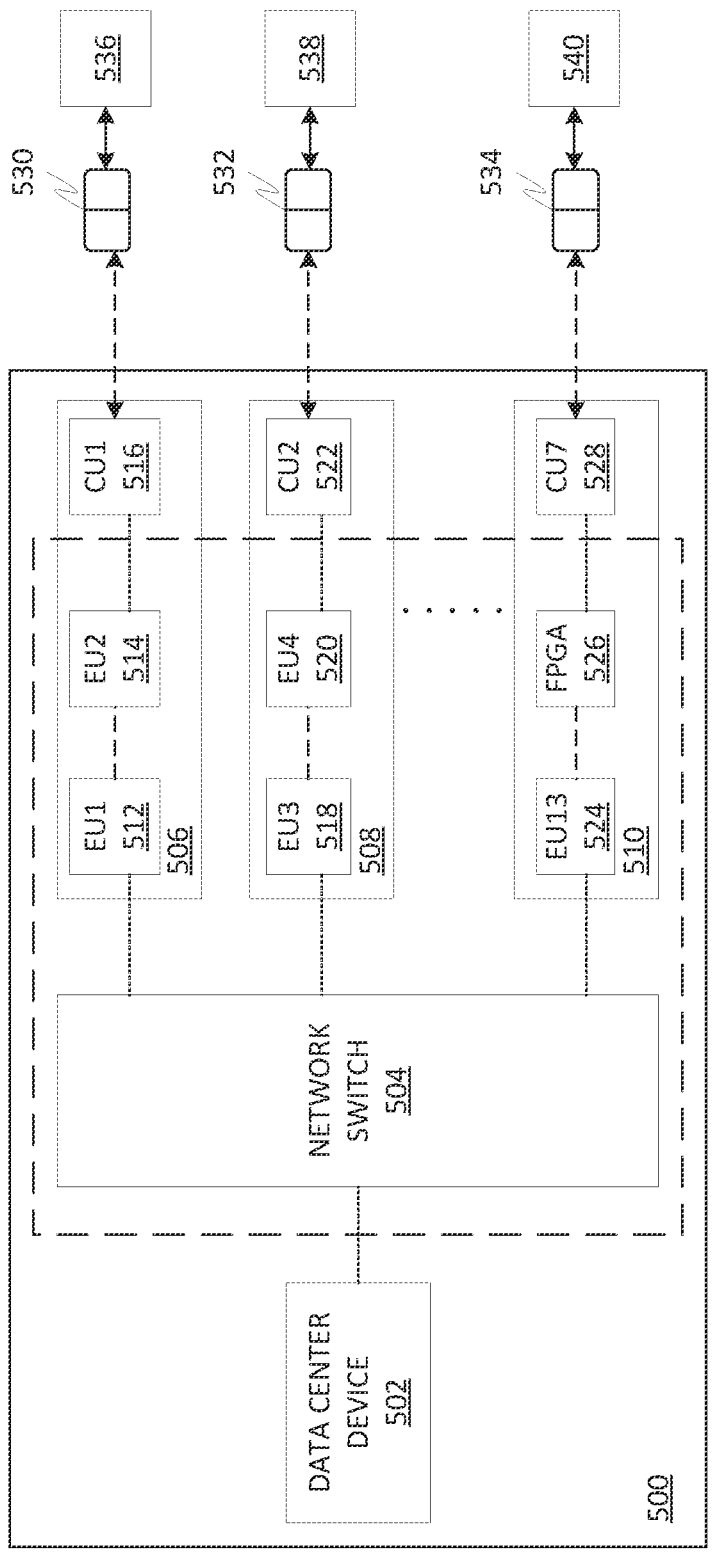
FIG. 5 is a block diagram of a system 500 for facilitating fog computing and providing resiliency against attacks, in accordance with some embodiments.

FIG. 5 is a block diagram of a system 500 for facilitating fog computing and providing resiliency against attacks, in accordance with some embodiments. Accordingly, the system 500 may include a data center device 502, a network switch 504, and a plurality of encryption retransmission devices 506-510.

Further, the network switch 504 may be communicatively coupled with the data center device 502. Further, the network switch 504 may include a plurality of ports.

Further, the plurality of encryption retransmission devices 506-510 may be connected with the network switch 504 through the plurality of ports. Further, at least one of the plurality of encryption retransmission devices 506-510 associated with at least one of the plurality of ports may include at least one encryption unit (512-514, 518-520, and 524-526) and at least one communication unit (516, 522, and 528). Further, the at least one encryption unit (512-514, 518-520, and 524-526) may be configured for encrypting an egressing native packet received from the network switch 504 using at least one encryption key to create an encrypted egressing native packet. Further, the data center device 502 may be configured for generating the egressing native packet. Further, the at least one encryption unit (512-514, 518-520, and 524-526) may be configured for adding a connectionless header to the encrypted egressing native packet to form an egressing connectionless datagram. Further, the at least one encryption unit (512-514, 518-520, and 524-526) may be configured for receiving an ingressing connectionless datagram that may include an ingressing encrypted native packet. Further, the at least one encryption unit (512-514, 518-520, and 524-526) may be configured for decrypting the encrypted ingressing native packet using the at least one encryption key to obtain an ingressing native packet. Further, the data center device 502 may be configured for performing at least one data center operation on the ingressing native packet for facilitating the fog computing. Further, the generating of the egressing native packet may be based on the performing. Further, the at least one communication unit (516, 522, and 528) may be communicatively coupled with the at least one encryption unit (512-514, 518-520, and 524-526). Further, the at least one communication unit (516, 522, and 528) may be paired with at least one external communication unit of at least one external encryption retransmission device (530, 532, and 534) associated with at least one external device (536, 538, and 540). Further, the at least one communication unit (516, 522, and 528) may be configured for receiving the egressing connectionless datagram. Further, the at least one communication unit (516, 522, and 528) may be configured for adding a complex header to the egressing connectionless datagram for forming an egressing packet for delivery to the at least one external encryption retransmission device (530, 532, and 534). Further, the at least one communication unit (516, 522, and 528) may be configured for receiving an ingressing packet may include the encrypted ingressing native packet and a complex header from the at least one external encryption retransmission device (530, 532, and 534). Further, the at least one communication unit (516, 522, and 528) may be configured for removing the complex header from the ingressing packet. Further, the at least one communication unit (516, 522, and 528) may be configured for adding a connectionless header to the ingressing packet for forming the ingressing connectionless datagram. Further, the ingressing connectionless datagram may include the encrypted ingressing native packet. Further, the at least one external encryption unit may be configured for encrypting an egressing native packet received from the at least one external device (536, 538, and 540) using at least one encryption key to create an encrypted egressing native packet. Further, the at least one external encryption unit may be configured for adding a connectionless header to the encrypted egressing native packet to form an egressing connectionless datagram. Further, the at least one external encryption unit may be configured for receiving an ingressing connectionless datagram that may include an ingressing encrypted native packet. Further, the at least one external encryption unit may be configured for decrypting the encrypted ingressing native packet using the at least one encryption key. Further, the at least one external communication unit may be paired with the at least one communication unit (516, 522, and 528) of at least one of the plurality of encryption retransmission devices 506-510. Further, the at least one external communication unit may be configured for receiving the egressing connectionless datagram. Further, the at least one external communication unit may be configured for adding a complex header to the egressing connectionless datagram for forming an egressing packet for delivery to at least one of the plurality of encryption retransmission devices 506-510. Further, the at least one external communication unit may be configured for receiving an ingressing packet may include the encrypted ingressing native packet and a complex header from at least one of the plurality of encryption retransmission devices 506-510. Further, the at least one external communication unit may be configured for removing the complex header from the ingressing packet. Further, the at least one external communication unit may be configured for adding a connectionless header to the ingressing packet for forming an ingressing connectionless datagram. Further, the ingressing connectionless datagram may include the encrypted ingressing native packet.

Further, in some embodiments, the plurality of encryption retransmission devices 506-510 may include at least one first encryption retransmission device 506 and at least one second encryption retransmission device 508. Further, the at least one first encryption retransmission device 506 may be connected to the network switch 504 through at least one first port of the plurality of ports. Further, the at least one first encryption retransmission device 506 may include at least one first encryption unit (512-514) and at least one first communication unit 516. Further, the at least one first encryption unit (512-514) may be configured for encrypting a first egressing native packet received from the network switch 504 through the at least one first port using at least one encryption key to create a first encrypted egressing native packet. Further, the at least one first encryption unit (512-514) may be configured for adding a connectionless header to the first encrypted egressing native packet to form a first egressing connectionless datagram. Further, the at least one first encryption unit (512-514) may be configured for receiving a first ingressing connectionless datagram that may include a first ingressing encrypted native packet. Further, the at least one first encryption unit (512-514) may be configured for decrypting the first encrypted ingressing native packet using the at least one encryption key to obtain a first ingressing native packet. Further, the at least one first communication unit 516 may be communicatively coupled with the at least one first encryption unit (512-514). Further, the at least one first communication unit 516 may be paired with at least one first external communication unit of at least one first external encryption retransmission device 530 associated with at least one first external device. Further, the at least one first communication unit 516 may be configured for receiving the first egressing connectionless datagram. Further, the at least one first communication unit 516 may be configured for adding a complex header to the first egressing connectionless datagram for forming a first egressing packet for delivery to the at least one first external encryption retransmission device 530. Further, the at least one first communication unit 516 may be configured for receiving a first ingressing packet and may include the first encrypted ingressing native packet and a complex header from the at least one first external encryption retransmission device 530. Further, the at least one first communication unit 516 may be configured for removing the complex header from the first ingressing packet. Further, the at least one first communication unit 516 may be configured for adding a connectionless header to the first ingressing packet for forming the first ingressing connectionless datagram. Further, the first ingressing connectionless datagram may include the first encrypted ingressing native packet. Further, the at least one second encryption retransmission device 508 may be connected to the network switch 504 through at least one second port of the plurality of ports. Further, the at least one second encryption retransmission device 508 may include at least one second encryption unit (518-520) and at least one second communication unit 522. Further, the at least one second encryption unit (518-520) may be configured for encrypting a second egressing native packet received from the network switch 504 through the at least one second port using at least one encryption key to create a second encrypted egressing native packet. Further, the network switch 504 may be configured for transmitting the first ingressing native packet as the second egressing native packet to the at least one second encryption unit (518-520). Further, the at least one second encryption unit (518-520) may be configured for adding a connectionless header to the second encrypted egressing native packet to form a second egressing connectionless datagram. Further, the at least one second encryption unit (518-520) may be configured for receiving a second ingressing connectionless datagram that may include a second ingressing encrypted native packet. Further, the at least one second encryption unit (518-520) may be configured for decrypting the second encrypted ingressing native packet using the at least one encryption key to obtain a second ingressing native packet. Further, the network switch 504 may be configured for transmitting the second ingressing native packet as the first egressing native packet to the at least one first encryption unit (512-514). Further, the at least one second communication unit 522 may be communicatively coupled with the at least one second encryption unit (518-520). Further, the at least one second communication unit 522 may be paired with at least one second external communication unit of at least one second external encryption retransmission device 532 associated with at least one second external device. Further, the at least one second communication unit 522 may be configured for receiving the second egressing connectionless datagram. Further, the at least one second communication unit 522 may be configured for adding a complex header to the second egressing connectionless datagram for forming a second egressing packet for delivery to the at least one second external encryption retransmission device 532. Further, the at least one second communication unit 522 may be configured for receiving a second ingressing packet may include the second encrypted ingressing native packet and a complex header from the at least one second external encryption retransmission device 532. Further, the at least one second communication unit 522 may be configured for removing the complex header from the second ingressing packet. Further, the at least one second communication unit 522 may be configured for adding a connectionless header to the second ingressing packet for forming the second ingressing connectionless datagram. Further, the second ingressing connectionless datagram may include the second encrypted ingressing native packet.

Further, in some embodiments, the data center device 502 may be at least one chip. Further, the at least one chip may be a Data Center on a Chip (DCoC).

Further, in some embodiments, at least one of the at least one encryption unit (512-514, 518-520, and 524-526) of at least one of the plurality of encryption retransmission devices 506-510 may include two encryption units. Further, the two encryption units may be communicatively coupled.

Further, in some embodiments, the plurality of ports may include a control port. Further, the plurality of encryption retransmission devices 506-510 may include a control encryption retransmission device 510. Further, the at least one encryption unit (524-526) of the control encryption retransmission device 510 may include an encryption unit 524 and a field-programmable gate array (FPGA) 526. Further, the encryption unit 524 may be communicatively coupled with the network switch 504 through the control port. Further, the FPGA 526 may be communicatively coupled with the at least one communication unit 528 of the control encryption retransmission device 510.

Figure 6:
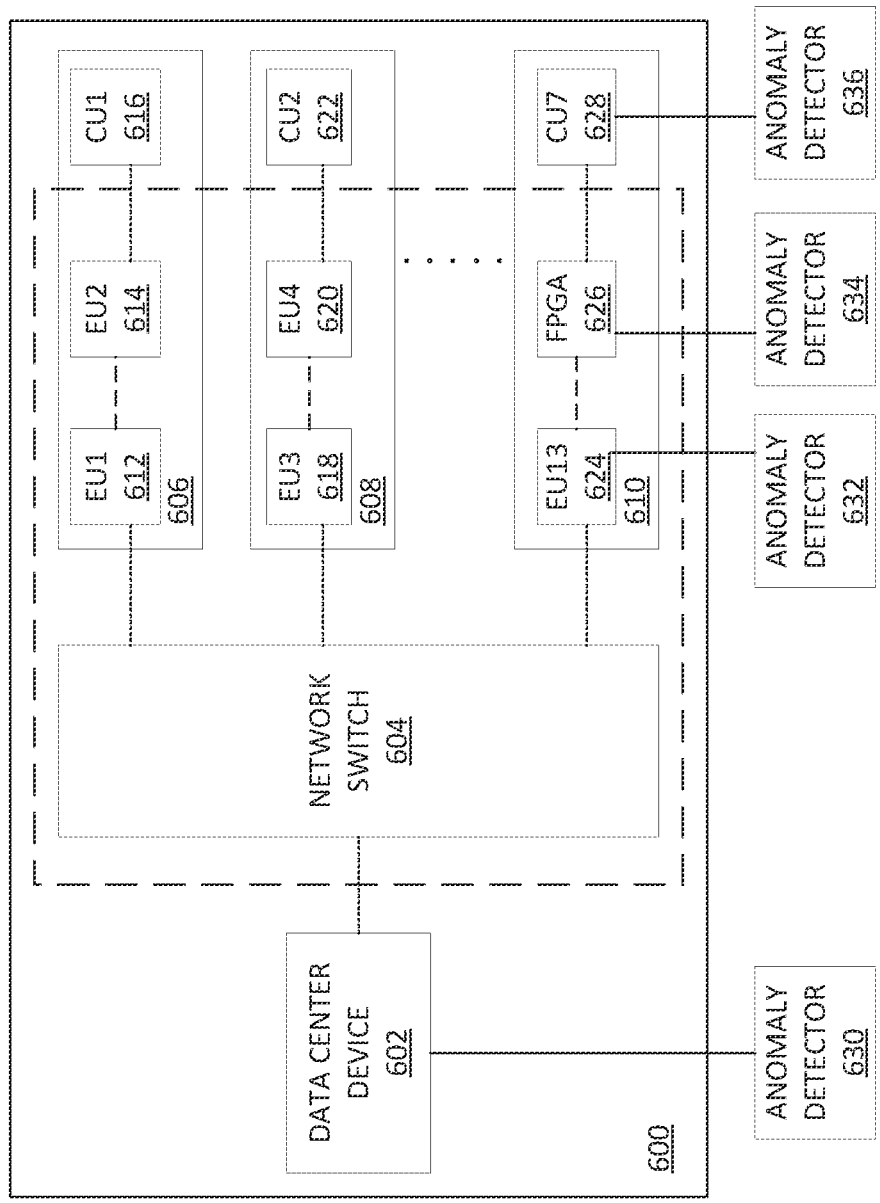
FIG. 6 is a block diagram of a system 600 for facilitating fog computing and providing resiliency against attacks, in accordance with some embodiments.

FIG. 6 is a block diagram of a system 600 for facilitating fog computing and providing resiliency against attacks, in accordance with some embodiments. Accordingly, the system 600 may include a data center device 602, a network switch 604, a plurality of encryption retransmission devices 606-610, and at least one anomaly detector 630-636.

Further, the network switch 604 may be communicatively coupled with the data center device 602. Further, the network switch 604 may include a plurality of ports.

Further, the plurality of encryption retransmission devices 606-610 may be connected with the network switch 604 through the plurality of ports. Further, at least one of the plurality of encryption retransmission devices 606-610 associated with at least one of the plurality of ports may include at least one encryption unit (612-614, 618-620, and 624-626) and at least one communication unit (616, 622, and 628). Further, the at least one encryption unit (612-614, 618-620, and 624-626) may be configured for encrypting an egressing native packet received from the network switch 604 using at least one encryption key to create an encrypted egressing native packet. Further, the data center device 602 may be configured for generating the egressing native packet. Further, the at least one encryption unit (612-614, 618-620, and 624-626) may be configured for adding a connectionless header to the encrypted egressing native packet to form an egressing connectionless datagram. Further, the at least one encryption unit (612-614, 618-620, and 624-626) may be configured for receiving an ingressing connectionless datagram that may include an ingressing encrypted native packet. Further, the at least one encryption unit (612-614, 618-620, and 624-626) may be configured for decrypting the encrypted ingressing native packet using the at least one encryption key to obtain an ingressing native packet. Further, the data center device 602 may be configured for performing at least one data center operation on the ingressing native packet for facilitating the fog computing. Further, the generating of the egressing native packet may be based on the performing. Further, the at least one communication unit (616, 622, and 628) may be communicatively coupled with the at least one encryption unit (612-614, 618-620, and 624-626). Further, the at least one communication unit (616, 622, and 628) may be paired with at least one external communication unit of at least one external encryption retransmission device associated with at least one external device. Further, the at least one communication unit (616, 622, and 628) may be configured for receiving the egressing connectionless datagram. Further, the at least one communication unit (616, 622, and 628) may be configured for adding a complex header to the egressing connectionless datagram for forming an egressing packet for delivery to the at least one external encryption retransmission device. Further, the at least one communication unit (616, 622, and 628) may be configured for receiving an ingressing packet may include the encrypted ingressing native packet and a complex header from the at least one external encryption retransmission device. Further, the at least one communication unit (616, 622, and 628) may be configured for removing the complex header from the ingressing packet. Further, the at least one communication unit (616, 622, and 628) may be configured for adding a connectionless header to the ingressing packet for forming the ingressing connectionless datagram. Further, the ingressing connectionless datagram may include the encrypted ingressing native packet.

Further, the at least one anomaly detector 630-636 may be communicatively coupled with at least one of the data center device 602 and at least one of the plurality of encryption retransmission devices 606-610. Further, the at least one anomaly detector 630-636 may be configured for analyzing at least one signal associated with at least one of the data center device 602 and at least one of the plurality of encryption retransmission devices 606-610 using at least one machine learning model. Further, the at least one anomaly detector 630-636 may be configured for determining an attack associated with at least one of the data center device 602 and at least one of the plurality of encryption retransmission devices 606-610 based on the analyzing. Further, the at least one anomaly detector 630-636 may be configured for generating an alert for the attack based on the determining of the attack.

Further, in some embodiments, the data center device 602 may be at least one chip. Further, the at least one chip may be a Data Center on a Chip (DCoC).

Figure 7:
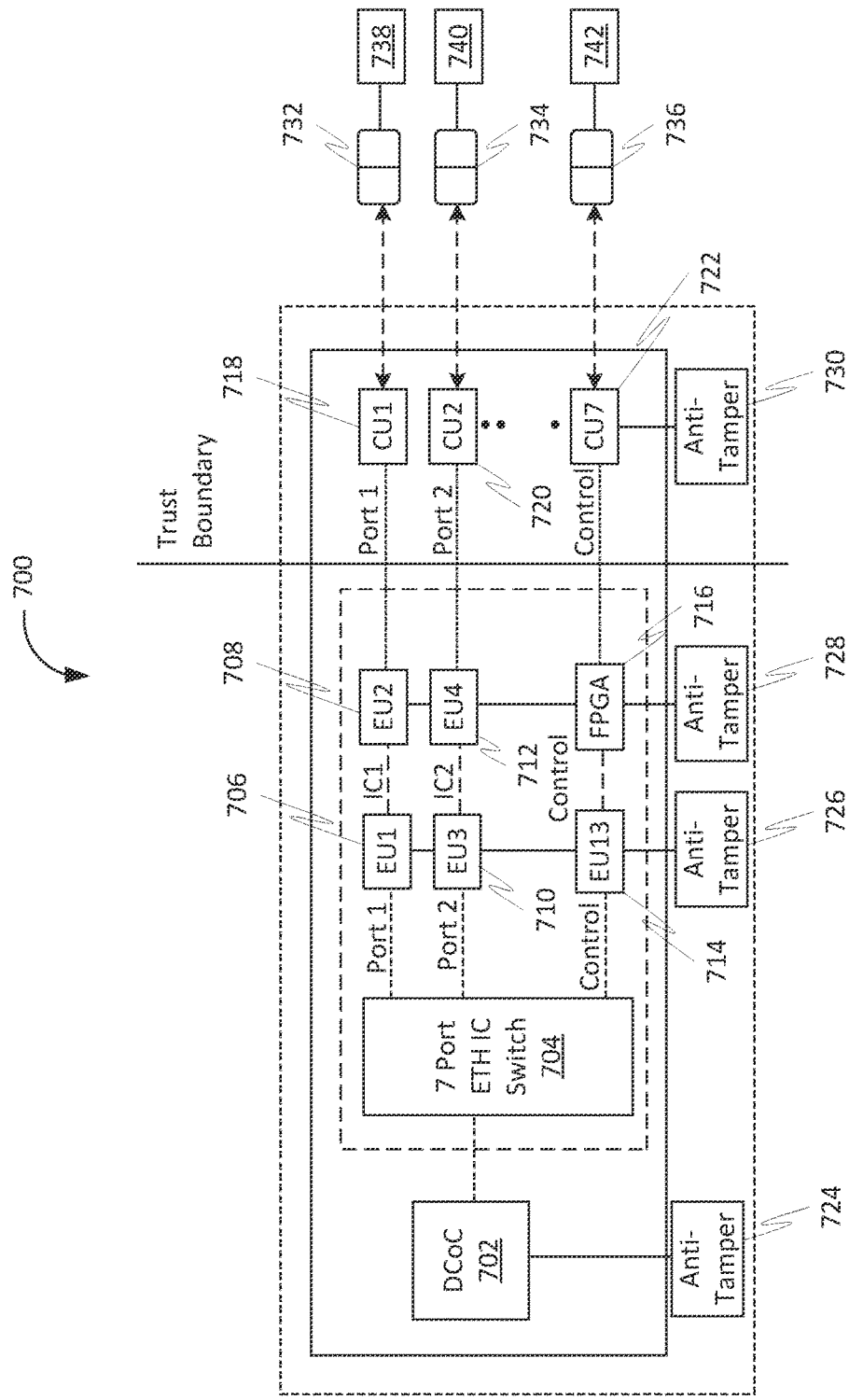
FIG. 7 is a schematic diagram of a system 700 for facilitating fog computing and providing resiliency against attacks, in accordance with some embodiments.

FIG. 7 is a schematic diagram of a system 700 for facilitating fog computing and providing resiliency against attacks, in accordance with some embodiments. Accordingly, the system 700 may include a Data Center on a Chip (DCoC) 702 and a seven-port Ethernet IC switch 704. Further, the seven-port Ethernet IC switch 704 may include a plurality of ports. Further, the plurality of ports may include port 1, port 2, control port, etc. Further, the system 700 may include two encryption units (EU1 (706) and EU2 (708)) that are coupled together and connected to the seven-port Ethernet IC switch 704 through the port 1, a communication unit (CU1 (718)) coupled with the two encryption units (EU1 (706) and EU2 (708)) on the port 1, and a first encryption retransmission device 732 coupled with the communication unit (CU1 (718)) which is coupled with an IoT device 738. Further, the system 700 may include two encryption units (EU3 (710) and EU4 (712)) that are coupled together and connected to the seven-port Ethernet IC switch 704 through the port 2, a communication unit (CU2 (720)) coupled with the two encryption units (EU3 (710) and EU4 (712)) on the port 2, and a second encryption retransmission device 734 coupled with the communication unit (CU2 (720)) which is coupled with sensors 740. Further, the system 700 may include an encryption unit (EU13 (714)) and a FPGA (716) that are coupled together and connected to the seven-port Ethernet IC switch 704 through the control port, a communication unit (CU7 (722)) coupled with the FPGA (716) on the control port, and a third encryption retransmission device 736 coupled with the communication unit (CU7 (722)) which is coupled with Fog services 742. Further, the system 700 may include at least one anti tamper unit 724-730 coupled with the DCoC 702, the encryption units (EU1 (706), EU3 (710), and EU13 (714)), the encryption units (EU2 (708) and EU4 (712)) and the FPGA 716, and the communication units (CU1 (718), CU2 (720), and CU7 (722)).

Figure 8:
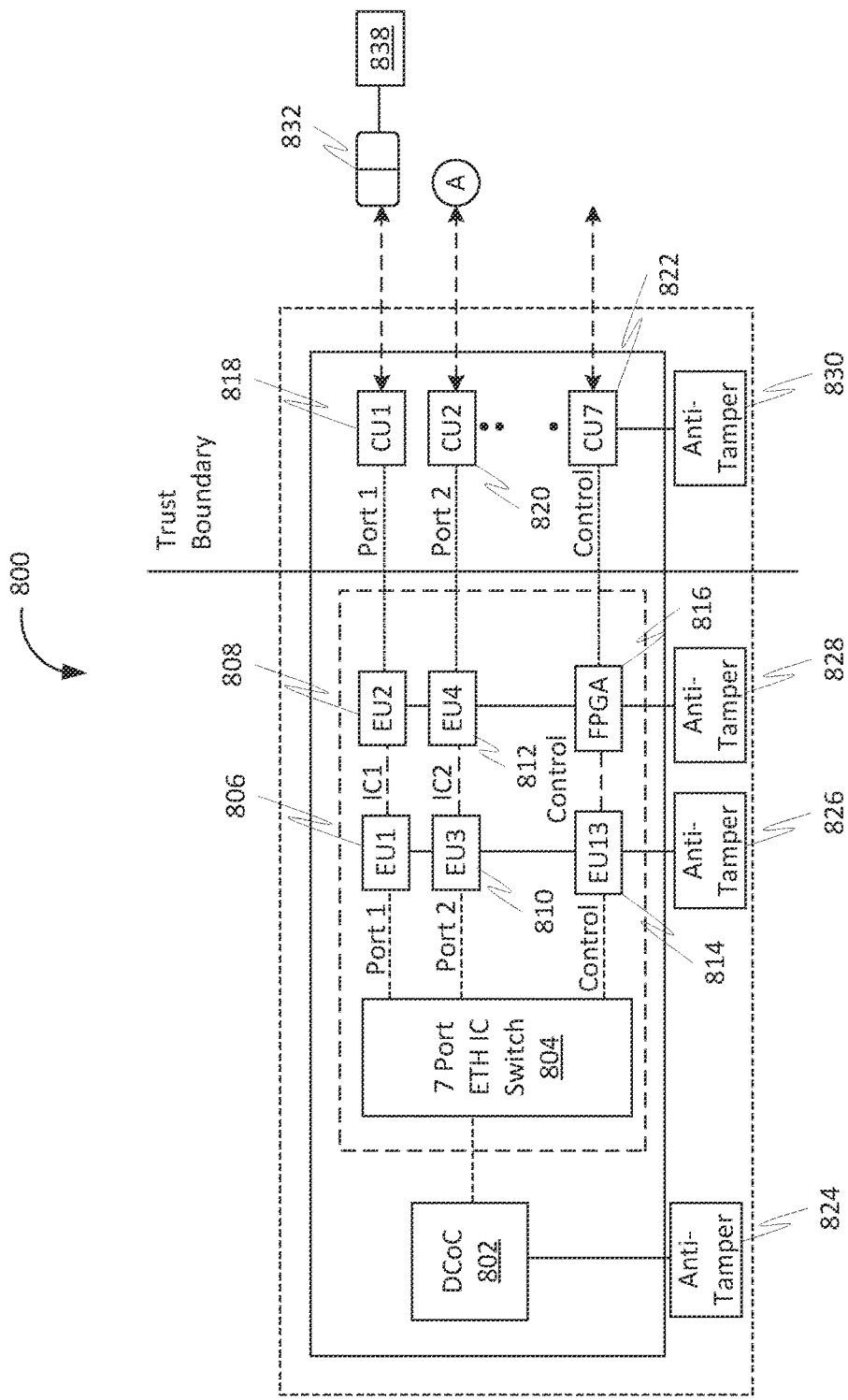
FIG. 8 is a schematic diagram of a system 800 for facilitating fog computing and providing resiliency against attacks with a secondary system 900, in accordance with some embodiments.

FIG. 8 is a schematic diagram of a system 800 for facilitating fog computing and providing resiliency against attacks with a secondary system 900, in accordance with some embodiments. Accordingly, the system 800 may include a Data Center on a Chip (DCoC) 802 and a seven-port Ethernet IC switch 804. Further, the seven-port Ethernet IC switch 804 may include a plurality of ports. Further, the plurality of ports may include port 1, port 2, control port, etc. Further, the system 800 may include two encryption units (EU1 (806) and EU2 (808)) that are coupled together and connected to the seven-port Ethernet IC switch 804 through the port 1, a communication unit (CU1 (818)) coupled with the two encryption units (EU1 (806) and EU2 (808)) on the port 1, and an encryption retransmission device 832 coupled with the communication unit (CU1 (818)) which is coupled with an IoT device 838. Further, the system 800 may include two encryption units (EU3 (810) and EU4 (812)) that are coupled together and connected to the seven-port Ethernet IC switch 804 through the port 2 and a communication unit (CU2 (820)) coupled with the two encryption units (EU3 (810) and EU4 (812)) on the port 2 and connected to a communication unit (CU1 (918)) of the secondary system 900. Further, the system 800 may include an encryption unit (EU13 (814)) and a FPGA (816) that are coupled together and connected to the seven-port Ethernet IC switch 804 through the control port, a communication unit (CU7 (822)) coupled with the FPGA (816) on the control port. Further, the system 800 may include at least one anti tamper unit 824-830 coupled with the DCoC 802, the encryption units (EU1 (806), EU3 (810), and EU13 (814)), the encryption units (EU2 (808) and EU4 (812)) and the FPGA 816, and the communication units (CU1 (818), CU2 (820), and CU7 (822)).

Further, the secondary system 900 may include a seven-port Ethernet IC switch 904. Further, the seven-port Ethernet IC switch 904 may include a plurality of ports. Further, the plurality of ports may include port 1, port 2, control port, etc. Further, the secondary system 900 may include two encryption units (EU1 (906) and EU2 (908)) that are coupled together and connected to the seven-port Ethernet IC switch 904 through the port 1 and a communication unit (CU1 (918)) coupled with the two encryption units (EU1 (906) and EU2 (908)) on the port 1 and coupled with the communication unit (CU2 (920)) of the system 800. Further, the secondary system 900 may include two encryption units (EU3 (910) and EU4 (912)) that are coupled together and connected to the seven-port Ethernet IC switch 904 through the port 2 and a communication unit (CU2 (920)) coupled with the two encryption units (EU3 (910) and EU4 (912)) on the port 2 and connected to an encryption retransmission device 932 associated with a device (such as sensors, IoT devices, computing devices, etc.) 938. Further, the secondary system 900 may include an encryption unit (EU13 (914)) and a FPGA (916) that are coupled together and connected to the seven-port Ethernet IC switch 904 through the control port, a communication unit (CU7 (922)) coupled with the FPGA (916) on the control port. Further, the secondary system 900 may include at least one anti tamper unit 926-930 coupled with the encryption units (EU1 (906), EU3 (910), and EU13 (914)), the encryption units (EU2 (908) and EU4 (912)) and the FPGA 916, and the communication units (CU1 (918), CU2 (920), and CU7 (922)).

Figure 9:
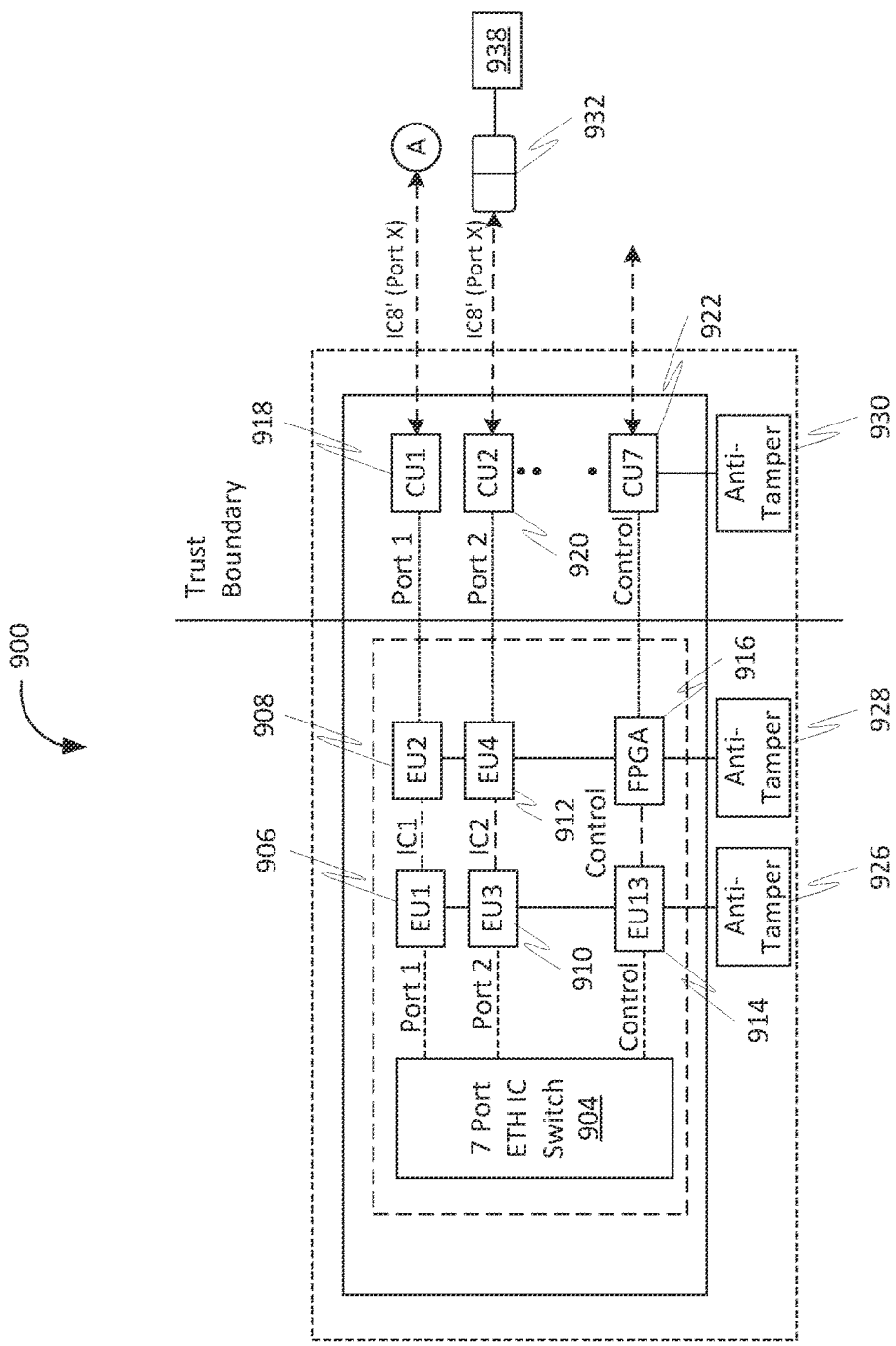
FIG. 9 is a continuation schematic diagram of the system 800 with the secondary system 900, in accordance with some embodiments.

FIG. 9 is a continuation schematic diagram of the system 800 with the secondary system 900, in accordance with some embodiments.

Figure 10:
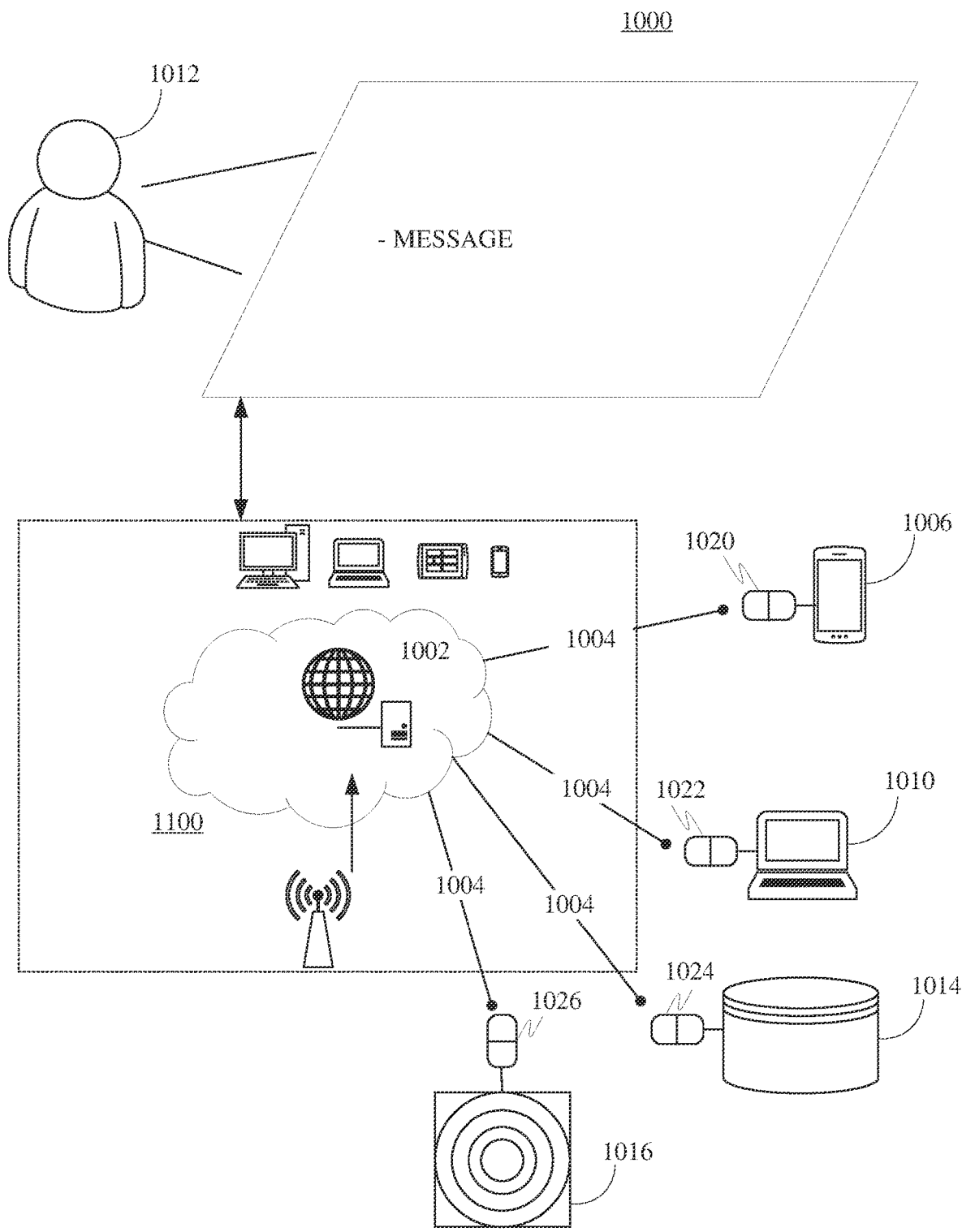
FIG. 10 is an illustration of an online platform consistent with various embodiments of the present disclosure.

FIG. 10 is an illustration of an online platform 1000 consistent with various embodiments of the present disclosure. By way of non-limiting example, the online platform 1000 to facilitate fog computing and providing resiliency against attacksm ay be hosted on a centralized server 1002, such as, for example, a cloud computing service. The centralized server 1002 may communicate with other network entities, such as, for example, a mobile device 1006 (such as a smartphone, a laptop, a tablet computer, etc.), other electronic devices 1010 (such as desktop computers, server computers, etc.), databases 1014, and sensors 1016, over a communication network 1004, such as, but not limited to, the Internet. Further, the mobile device 1016 may be connected with a first encryption retransmission device 1020, the electronic device 1010 may be connected with a second encryption retransmission device 1022, the databases 1014 may be connected with a third encryption retransmission device 1024, the sensors 1016 may be connected with a fourth encryption retransmission device 1024. Further, the network entities may communicate with each other using an encryption retransmission device connected with each network entity. Further, users of the online platform 1000 may include relevant parties such as, but not limited to, end-users, administrators, service providers, service consumers, and so on. Accordingly, in some instances, electronic devices operated by the one or more relevant parties may be in communication with the platform.

A user 1012, such as the one or more relevant parties, may access online platform 1000 through a web-based software application or browser. The web-based software application may be embodied as, for example, but not be limited to, a website, a web application, a desktop application, and a mobile application compatible with a computing device 1100.

Figure 11:
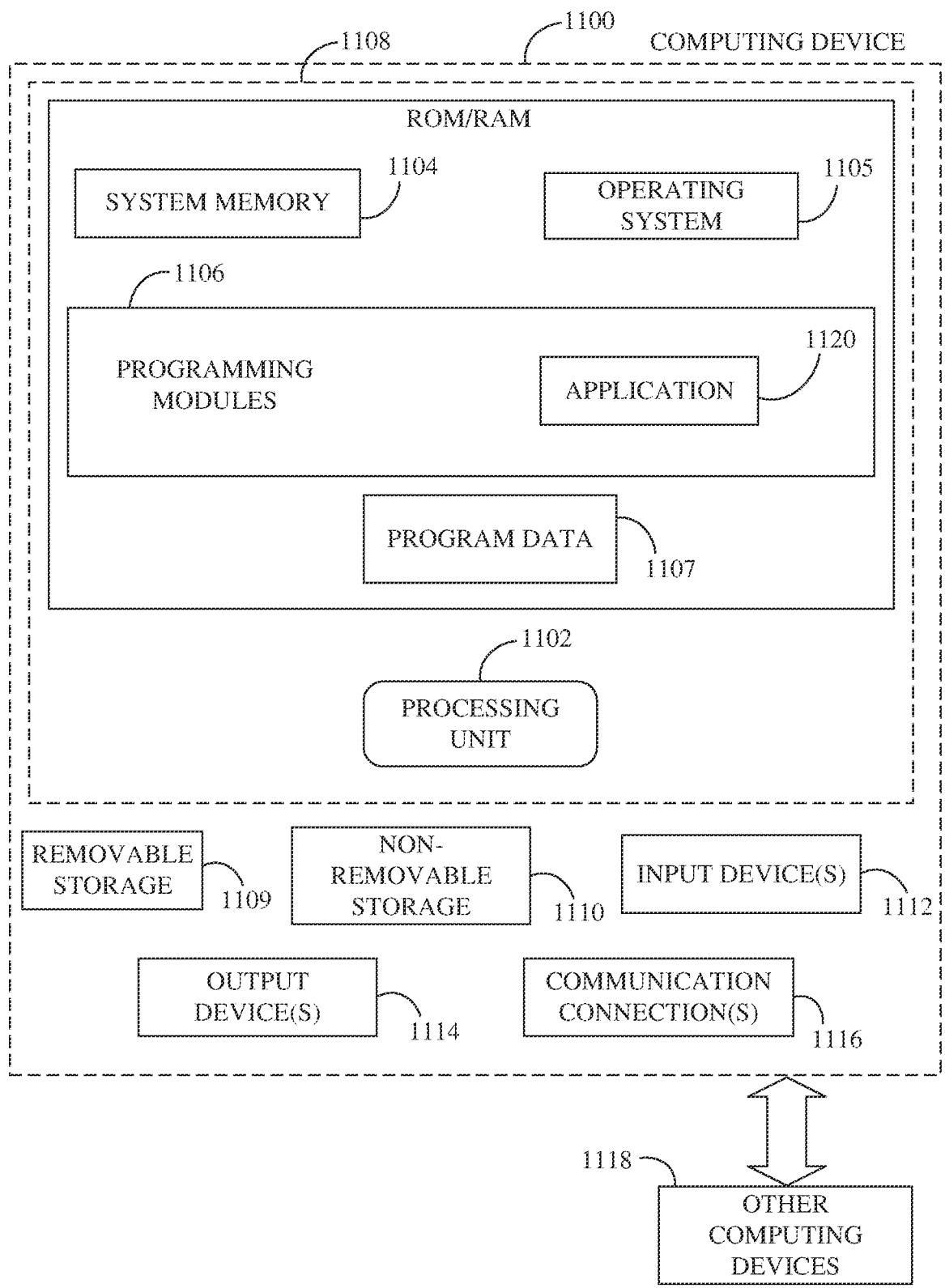
FIG. 11 is a block diagram of a computing device for implementing the methods disclosed herein, in accordance with some embodiments.

With reference to FIG. 11, a system consistent with an embodiment of the disclosure may include a computing device or cloud service, such as computing device 1100. In a basic configuration, computing device 1100 may include at least one processing unit 1102 and a system memory 1104. Depending on the configuration and type of computing device, system memory 1104 may comprise, but is not limited to, volatile (e.g., random-access memory (RAM)), non-volatile (e.g., read-only memory (ROM)), flash memory, or any combination. System memory 1104 may include operating system 1105, one or more programming modules 1106, and may include a program data 1107. Operating system 1105, for example, may be suitable for controlling computing device 1100's operation. In one embodiment, programming modules 1106 may include image-processing module, machine learning module. Furthermore, embodiments of the disclosure may be practiced in conjunction with a graphics library, other operating systems, or any other application program and is not limited to any particular application or system. This basic configuration is illustrated in FIG. 11 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and non-volatile, removable and non-removable media implemented in any method or technology for storage of information, such as computer-readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, a location sensor, a camera, a biometric sensor, etc. Output device(s) 1114 such as a display, speakers, a printer, etc. may also be included. The aforementioned devices are examples and others may be used.

Computing device 1100 may also contain a communication connection 1116 that may allow device 1100 to communicate with other computing devices 1118, such as over a network in a distributed computing environment, for example, an intranet or the Internet. Communication connection 1116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1104, including operating system 1105. While executing on processing unit 1102, programming modules 1106 (e.g., application 1120 such as a media player) may perform processes including, for example, one or more stages of methods, algorithms, systems, applications, servers, databases as described above. The aforementioned process is an example, and processing unit 1102 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A system for facilitating fog computing and providing resiliency against attacks, the system comprising:
    a data center device having an AI chip and on-board flash memory;
    a network switch communicatively coupled with the data center device, wherein the network switch comprises a plurality of ports;
    a model aggregator device configured to provide updates for machine learning models based on requests; and
    a plurality of encryption retransmission devices connected with the network switch through the plurality of ports, wherein at least one of the plurality of encryption retransmission devices associated with at least one of the plurality of ports comprises:
        at least one encryption processor implemented on a printed circuit board (PCB) with galvanic isolation to isolate data and power pins, wherein the encryption processor is configured for:
            encrypting an egressing native packet received from the network switch using at least one encryption key to create an encrypted egressing native packet, wherein the data center device is configured for generating the egressing native packet;
            adding a connectionless header to the encrypted egressing native packet to form an egressing connectionless datagram;

receiving an ingressing connectionless datagram comprising an ingressing encrypted native packet; and decrypting the encrypted ingressing native packet using the at least one encryption key to obtain an ingressing native packet, wherein the data center device is configured for performing at least one data center operation on the ingressing native packet for facilitating the fog computing, wherein the generating of the egressing native packet is based on the performing, wherein when the ingressing native packet comprises a request for updating a machine learning model, the encryption processor is configured for encrypting a native packet corresponding to an update received from the model aggregator device; and at least one network interface module (NIM) implemented on the PCB communicatively coupled with the at least one encryption processor, wherein the at least one NIM is paired with at least one external NIM of at least one external encryption retransmission device associated with at least one external device, wherein the at least one NIM is configured for:

receiving the egressing connectionless datagram;

adding a complex header to the egressing connectionless datagram for forming an egressing packet for delivery to the at least one external encryption retransmission device, wherein when the egressing connectionless datagram contains an encrypted native packet corresponding to a machine learning model update, the NIM is configured for secure delivery of the model update to the at least one external encryption retransmission device;

receiving an ingressing packet comprising the encrypted ingressing native packet and a complex header from the at least one external encryption retransmission device;

removing the complex header from the ingressing packet; and adding a connectionless header to the ingressing packet for forming the ingressing connectionless datagram, wherein the ingressing connectionless datagram comprises the encrypted ingressing native packet.

2. The system of claim 1, wherein the plurality of encryption retransmission devices comprises:

at least one first encryption retransmission device connected to the network switch through at least one first port of the plurality of ports, wherein the at least one first encryption retransmission device comprises:

at least one first encryption processor implemented on a printed circuit board (PCB) with galvanic isolation to isolate data and power pins, wherein the encryption processor is configured for:

encrypting a first egressing native packet received from the network switch through the at least one first port using at least one encryption key to create a first encrypted egressing native packet;

adding a connectionless header to the first encrypted egressing native packet to form a first egressing connectionless datagram;

receiving a first ingressing connectionless datagram comprising a first ingressing encrypted native packet; and decrypting the first encrypted ingressing native packet using the at least one encryption key to obtain a first ingressing native packet; and at least one first network interface module (NIM) implemented on the PCB communicatively coupled with the at least one first encryption processor, wherein the at least one first NIM first communication unit is paired with at least one first external NIM of at least one first external encryption retransmission device associated with at least one first external device, wherein the at least one first NIM is configured for:

receiving the first egressing connectionless datagram;

adding a complex header to the first egressing connectionless datagram for forming a first egressing packet for delivery to the at least one first external encryption retransmission device;

receiving a first ingressing packet comprising the first encrypted ingressing native packet and a complex header from the at least one first external encryption retransmission device;

removing the complex header from the first ingressing packet; and adding a connectionless header to the first ingressing packet for forming the first ingressing connectionless datagram, wherein the first ingressing connectionless datagram comprises the first encrypted ingressing native packet; and at least one second encryption retransmission device connected to the network switch through at least one second port of the plurality of ports, wherein the at least one second encryption retransmission device comprises:

at least one second encryption implemented on a printed circuit board (PCB) with galvanic isolation to isolate data and power pins, wherein the encryption processor is configured for:

encrypting a second egressing native packet received from the network switch through the at least one second port using at least one encryption key to create a second encrypted egressing native packet, wherein the network switch is configured for transmitting the first ingressing native packet as the second egressing native packet to the at least one second encryption processor;

adding a connectionless header to the second encrypted egressing native packet to form a second egressing connectionless datagram;

receiving a second ingressing connectionless datagram comprising a second ingressing encrypted native packet; and decrypting the second encrypted ingressing native packet using the at least one encryption key to obtain a second ingressing native packet, wherein the network switch is configured for transmitting the second ingressing native packet as the first egressing native packet to the at least one first encryption processor; and at least one second network interface module (NIM) implemented on the PCB communicatively coupled with the at least one second encryption processor, wherein the at least one second NIM is paired with at least one second external NIM of at least one second external encryption retransmission device associated with at least one second external device, wherein the at least one second NIM is configured for:

receiving the second egressing connectionless datagram;
adding a complex header to the second egressing connectionless datagram for forming a second egressing packet for delivery to the at least one second external encryption retransmission device;
receiving a second ingressing packet comprising the second encrypted ingressing native packet and a complex header from the at least one second external encryption retransmission device;
removing the complex header from the second ingressing packet; and
adding a connectionless header to the second ingressing packet for forming the second ingressing connectionless datagram, wherein the second ingressing connectionless datagram comprises the second encrypted ingressing native packet.

3. The system of claim 1, wherein the AI chip is a Data Center on a Chip (DCoC).

4. The system of claim 1, wherein at least one of the at least one encryption processor of at least one of the plurality of encryption retransmission devices comprises two encryption processors, wherein the two encryption processors are communicatively coupled.

5. The system of claim 1, wherein the plurality of ports comprises a control port, wherein the plurality of encryption retransmission devices comprises a control encryption retransmission device, wherein the at least one encryption processor of the control encryption retransmission device comprises an encryption processor and a field-programmable gate array (FPGA), wherein the encryption processor is communicatively coupled with the network switch through the control port, wherein the FPGA is communicatively coupled with the at least one NIM of the control encryption retransmission device.

6. The system of claim 1, wherein the at least one external encryption retransmission device comprises:
at least one external encryption processor implemented on a printed circuit board (PCB) with galvanic isolation to isolate data and power pins, wherein the encryption processor is configured for:
encrypting an egressing native packet received from the at least one external device using at least one encryption key to create an encrypted egressing native packet;
adding a connectionless header to the encrypted egressing native packet to form an egressing connectionless datagram;
receiving an ingressing connectionless datagram comprising an ingressing encrypted native packet; and
decrypting the encrypted ingressing native packet using the at least one encryption key; and
the at least one external NIM implemented on the PCB paired with the at least one NIM of at least one of the plurality of encryption retransmission devices, wherein the at least one external NIM is configured for:
receiving the egressing connectionless datagram;
adding a complex header to the egressing connectionless datagram for forming an egressing packet for delivery to at least one of the plurality of encryption retransmission devices;
receiving an ingressing packet comprising the encrypted ingressing native packet and a complex header from at least one of the plurality of encryption retransmission devices;
removing the complex header from the ingressing packet; and
adding a connectionless header to the ingressing packet for forming an ingressing connectionless datagram, wherein the ingressing connectionless datagram comprises the encrypted ingressing native packet.

7. The system of claim 6, wherein the at least one encryption processor is configured for sending at least one message to the at least one external encryption processor.

8. The system of claim 7, wherein the at least one message manages at least one cryptographic state of the at least one encryption processor and the at least one external encryption processor.

9. The system of claim 7, wherein the at least one message manages at least one encryption key associated with the at least one encryption processor and the at least one external encryption processor.

10. The system of claim 7, wherein the at least one message manages at least one algorithm associated with the at least one encryption processor and the at least one external encryption processor.

11. The system of claim 7, wherein the at least one message manages at least one status associated with the at least one encryption processor and the at least one external encryption processor.

12. The system of claim 1, wherein the at least one encryption processor is communicatively coupled to the at least one NIM via a one-way connection for providing at least one instruction to the at least one NIM.

13. The system of claim 1, further comprising at least one anomaly detector communicatively coupled with at least one of the data center device and at least one of the plurality of encryption retransmission devices, wherein the at least one anomaly detector is configured for:
analyzing at least one signal associated with at least one of the data center device and at least one of the plurality of encryption retransmission devices using at least one machine learning model, wherein the machine learning model is updated using the model aggregator device;
determining an attack associated with at least one of the data center device and at least one of the plurality of encryption retransmission devices based on the analyzing; and
generating an alert for the attack based on the determining of the attack, wherein the alert triggers an immune system response to protect against the attack.

* * * * *